July 1, 1947.  H. G. BUSIGNIES  2,423,082
IMPULSE RADIATION OBSTACLE DETECTOR
Filed Feb. 24, 1941  3 Sheets-Sheet 1

INVENTOR
HENRI G. BUSIGNIES
BY
ATTORNEY

July 1, 1947.  H. G. BUSIGNIES  2,423,082
IMPULSE RADIATION OBSTACLE DETECTOR
Filed Feb. 24, 1941  3 Sheets-Sheet 2
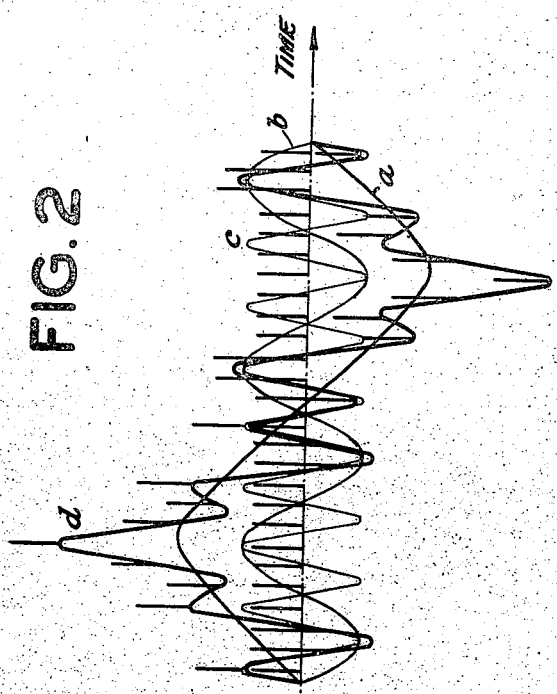
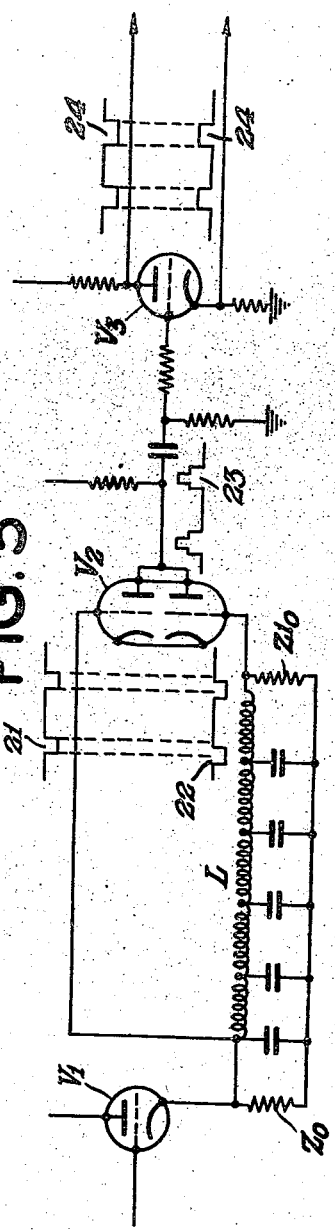
INVENTOR
HENRI G. BUSIGNIES
BY Edward D. Phinney
ATTORNEY July 1, 1947.  H. G. BUSIGNIES  2,423,082
IMPULSE RADIATION OBSTACLE DETECTOR
Filed Feb. 24, 1941  3 Sheets-Sheet 3
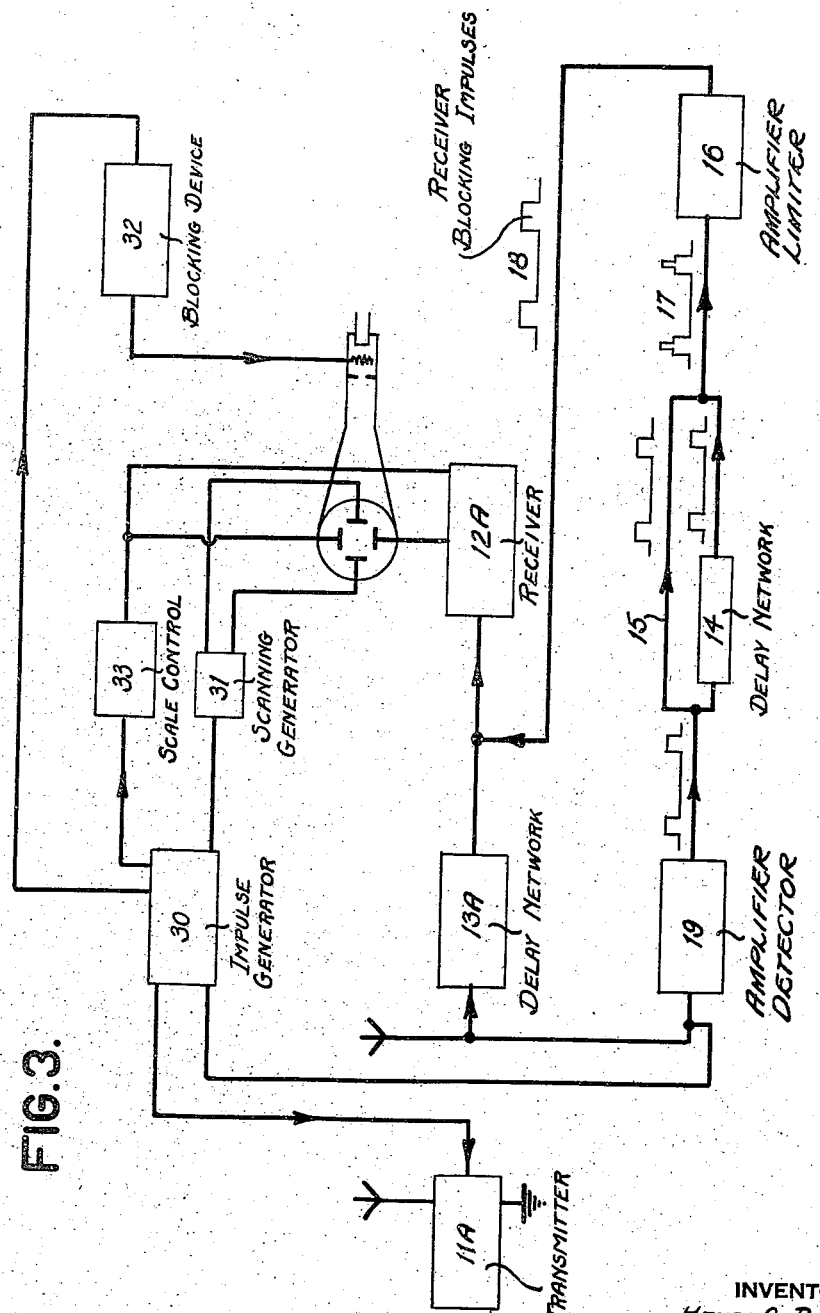
INVENTOR
HENRI G. BUSIGNIES
BY
ATTORNEY Patented July 1, 1947

2,423,082

UNITED STATES PATENT OFFICE 2,423,082

IMPULSE RADIATION OBSTACLE DETECTOR

Henri G. Busignies, Forest Hills, N. Y., assignor to International Standard Electric Corporation, New York, N. Y., a corporation of Delaware Application February 24, 1941, Serial No. 380,186
In France March 30, 1940

9 Claims. (Cl. 250—1.66)

The present invention relates to systems of radioelectric impulses that are particularly applicable for the detection of obstacles by the echo method.

According to the invention, an impulse generator may comprise in particular a frequency multiplying device, starting from a frequency such as that of the network power supply and furnishing a wave having a period that corresponds approximately to twice the desired maximum duration of the impulses. By a limiting process there are obtained from this wave signals of trapezoidal shape and of adjustable duration, which are transformed into rectangular signals. The superposing on these rectangular impulses of waves having frequencies that correspond to or are multiples of the desired cadence of emission permits the sending out of only one impulse at relatively widely spaced intervals, e. g. 50 per second.

In order to avoid overloading of the receiver during transmission, impulses sent out from the transmitter control a blocking device for the receiver. In order to make the blocking more effective, the invention provides for the use of two auxiliary impulses that are staggered, one prior to and the other subsequent to the transmitted impulse for which the receiver is to be blocked.

In accordance with another feature of the invention means is provided responsive to impulses from the transmitter or in the receiver lines for blocking the cathode ray tube and for producing a scale indication on the cathode ray tube screen.

The invention is explained hereunder for one example of an embodiment shown in the appended drawings, in which:

Fig. 2 is a diagram used in explaining operation of the circuit of Fig. 1;

Fig. 3 illustrates one example of an embodiment of a blocking system;

Fig. 4 is a diagram used in explaining the operation of the circuit of Fig. 3; and Fig. 5 is a more detailed schematic view of an embodiment of portion of the blocking circuit.

Figure 1:
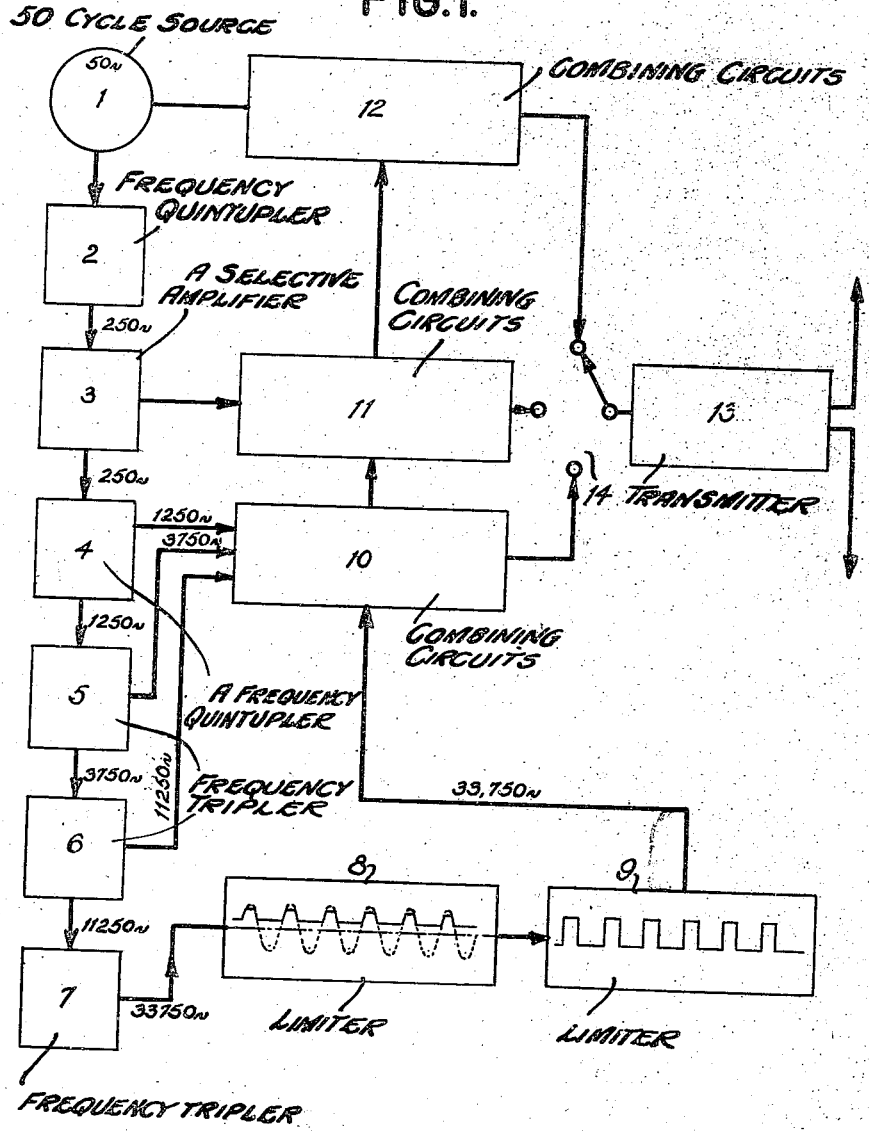
Fig. 1 illustrates an impulse generator.

It is known that, in order to detect an obstacle by the impulse emission method, a suitable degree of precision requires the sending out of impulses of as rectangular a shape as possible, or of very short duration as compared with the distances to be determined, and with a definite cadence.

Fig. 1 illustrates an embodiment of an example of an impulse emitter starting from the socket frequency of 50 cycles per second. The cadences of emission of the impulses may be 50, 250 and 1250 periods per second, for example, and their duration may vary between 5 and 10 microseconds. The network supply of 50 cycles per second after reaching 1 is fed to a frequency quintupler 2 followed by a 250 cycles per second selective amplifier 3, thus furnishing a straight 250 cycles per second which is applied to a second quintupler 4, which furnishes 1250 cycles per second and is itself followed by three triplers 5, 6 and 7 which furnish 3,750, 11,250 and 33,750 cycles per second respectively.

The frequency of 33,750 cycles per second serves for obtaining elementary impulse signals which are obtained by a limiting device 8. This limiting device consists, for example, of a triode, use being made of its grid cut-off or plate cut-off or both for obtaining signals of trapezoidal shape that correspond to a slice of the sine oscillations. Such limiters are well known and need not be described in detail. The width of these signals may be varied by cutting the sine oscillation further from or closer to the peak, the maximum width corresponding to approximately 15 microseconds, half the time length of the selected period of 33,750 per second.

These trapeozidal signals are given a more rectangular shape by means of another limiting device 9.

Device 9 accordingly furnishes signals of rectangular shape and of variable duration at the cadence of 33,750 per second. In order to emit these signals without altering their shape but at a reduced number of periods per second, 1250, for example, they are superposed on the 1250 cycle wave, shown in Fig. 2 at $a$, that is produced by the quintupler 4 which is itself deformed by the superposing of a third harmonic, shown at $b$, and of a ninth harmonic, shown at $c$, which are produced by the frequency triplers 5 and 6. The wave shape thus obtained, which is shown at $d$, is itself very sharp and, after the 33,750 P. P. S. impulses are superposed, the cut-off or limiter device 10 can easily separate out the rectangular impulse that corresponds to the maximum of this 1250 cycle wave so as to furnish impulses at the rate of 1250 per second.

The 1250 P. P. S. impulses may be utilized direct at the output of the cut-off device 10 or they may be employed in a further similar device 11 so as to obtain impulses at 250 P. P. S. by superposing on them the wave furnished by the quintupler 2.

A similar additional stage 12 will permit obtaining from these 250 P. P. S. impulses of impulses having the cadence of the network supply, i. e. 50 per second.

The impulses of the selected cadence serve for controlling the emission of a transmitting station 13. At the same time they are used for blocking the receiver during the emission and for controlling the scanning and synchronizing systems of the receiver. The impulse of the selected cadence proceeding from devices 10, 11 or 12 can be selectively sent over the working circuit 13 by means of the switch 14.

Fig. 3 illustrates one example of an embodiment of a blocking circuit of the kind controlled by the transmitter impulses.

In this Figure 3, 11A designates the transmitter that sends out the impulses, and 12A the receiver. The transmitter and receiver may be arranged near to one another so that distances of objects may be observed by a reflection method. A retardation line or delay network 13A is located between the antenna and the receiver. The blocking is effected by an auxiliary circuit disposed subsequent to amplifier detector tube 19. One branch 15 of this auxiliary circuit transmits the impulses directly to a control amplifier 16 and the other branch transmits the impulses to said control amplifier over a line 14 having a greater delay than line 13. The impulses received by the control amplifier limiter 16 accordingly have the shape shown at 17, and, after leaving this control device which is provided with a limiter, they have the shape shown at 18, under which shape they are applied to receiver 12A in order to block it. The delay in network 13A is less than that in network 14. In this way the blocking signals start a little before the arrival at the receiver of the impulses from the transmitter and only cease a little while after termination of these impulses.

As shown in the figure an impulse generator 30 which may correspond to that shown in Fig. 1 is shown supplying energy to transmitter 11A and directly connected with amplifier detector 19. It should be understood, however, that the impulse supplied to 19 may be fed thereto from the receiving antenna instead of using this direct connection.

Connected to the impulse generator 30 is a scanning generator 31 which serves to produce scanning displacement of the cathode ray beam. Also, a blocking circuit 32 and scale producing control means 33 are shown under direct control of the impulse generator. These devices may be of any desired construction and preferably are made in accordance with the teaching of my application entitled "Scanning device for cathode-ray oscillographs," Ser. No. 380,187, filed on even date herewith.

It is, of course, clear that the blocking device 32, the scanning generator 31, and the scale control means 33 may be controlled by impulses received on the receiving antenna instead of by the direct coupling means illustrated.

Fig. 4 illustrates the relative arrangement in time of the impulses. A designates the envelope of the high frequency impulses sent out by the transmitter, B indicates the envelope of the impulses that reach the receiver, and C indicates the blocking impulses; it can be seen that these impulses start a little before the wave trains reach the receiver and end a little after these wave trains.

Fig. 5 is a more detailed schematic view of an example of embodiment of a blocking circuit.

The impulses proceeding from the generator 30 (Fig. 3) are applied between the grid and cathode of tube $V_1$. To the cathode, for example, there is connected an artificial line L which forms the output circuit and has both ends terminated in its characteristic impedances $Z_0$ and $Z_{10}$. The voltages at the input and the output of the line L are applied to the two grids of a double triode $V_2$.

The plates of these two triodes are in parallel. The lag between the impulses thus applied to the two grids of the double triode is equal to the travel time of the impulses over line L, and this time is selected so as to obtain the desired widening of the impulses.

The resultant obtained in the plate circuit of tube $V_2$ has the shape shown at 23, 21 and 22 being the impulses applied to the grids.

A tube $V_3$ serves for cutting off the top part of the signals 23 by grid current or plate current according to the polarity of the signals 23.

In this way there are obtained the signals 24 which are sent to the receiver to be blocked, e. g, by applying them with a negative sign to the suppressor grid of the receiver tubes, for example.

Although the invention has been described with respect to the above examples of embodiment, it is evident that it is by no means limited to them and that it is capable of numerous variations without departing from its scope.

What is claimed is:

1. A receiving system for use with a closely associated impulse transmitter and short electrical impulse generator, said system including a receiver in which received impulses serve to render said receiver inoperative for a period of a duration embracing the normal reception period of each said impulse, comprising a receiving pick-up means for receiving the impulses from said transmitter, a control amplifier limiter, a receiver for said impulses, a delay network interconnecting said receiver and said pick-up means, and means for rendering said receiver inoperative with respect to the directly transmitted impulses, comprising means interconnecting said pick-up means and said control amplifier for supplying said impulses directly to said control amplifier, other means for interconnecting said pick-up means and said amplifier for supplying said impulses with a delay greater than the delay caused by said delay network, means for combining said directly supplied and said delayed impulses in said amplifier to produce impulses longer in duration than said transmitted impulses, and means for directly coupling the output of said amplifier to said receiver to render said receiver inoperative for a period greater than the duration of said transmitted impulses under control of said impulses of longer duration.

2. A system according to claim 1, wherein said impulse generator includes means for producing impulses widely spaced in time with respect to the duration of said impulses comprising a source of alternating current, of a first frequency, first and second tandem connected frequency multipliers connected in that given order to said source, limiting means connected to the output of said second frequency multiplier for producing substantially flat topped impulses of a period and duration determined by the frequency of said second frequency multiplier, a combining circuit having its input connected to the output of said first multiplier and to the output said limiting means for combining said impulses and the energy of the frequency of said first frequency multiplier to produce impulses of the duration determined by said second frequency multiplier and a period determined by said first frequency multiplier.

3. An impulse generator for producing impulses widely spaced in time with respect to the duration of said impulses comprising a source of alternating current of a first frequency, first and second tandem connected frequency multipliers connected in that given order to said source, limiting means connected to the output of said second frequency multiplier for producing substantially flat topped impulses of a period and duration determined by the frequency of said second frequency multiplier, a combining circuit having its input connected to the output of said first multiplier and the output of said limiting means for combining said impulses and the energy of the frequency of said first frequency multiplier to produce impulses of the duration determined by said second frequency multiplier and a period determined by said first frequency multiplier.

4. An impulse generator according to claim 3, wherein said frequency multiplier comprises a frequency quintupler.

5. System for obstacle detection by electromagnetic waves comprising a transmitter for transmitting impulses consisting of short trains of electromagnetic waves, a receiver for receiving said waves after reflection by an object, a circuit for rendering said receiver inoperative, means for deriving from said transmitter impulses of the same wave form and periodicity as said transmitted impulses, means for applying said derived impulses to said circuit over two paths, and a delay network in one of said paths.

6. System for obstacle detection by electromagnetic waves comprising a transmitter for transmitting impulses consisting of short trains of electromagnetic waves, a receiver for receiving said waves after reflection by an object, a blocking circuit for rendering said receiver inoperative comprising a first thermionic tube and a pair of mixing tubes, a delay network the input terminals of which are connected in series in the output circuit of said first tube, means for deriving from said transmitter impulses of the same wave form and periodicity as said transmitted impulses and for applying them to the input circuit of said first tube and means for deriving from said delay network trains of impulses having different delay periods and for applying them respectively to the input circuits of the respective mixing tubes.

7. System for obstacle detection by electromagnetic waves comprising a transmitter for transmitting impulses consisting of short trains of electromagnetic waves, a receiver for receiving said waves after reflection by an object, means for deriving from said transmitter two trains of impulses of the same wave form and periodicity as said transmitted impulses but having a relative time delay such that the impulses of each train overlap in time, means for combining said two trains of impulses to provide a single train of impulses having a duration longer than that of said transmitted impulses and means for applying said impulses of longer duration to said receiver to render it inoperative during periods extending from a short time before to a short time after the appearance at the receiver of impulses directly radiated by said transmitter.

8. System for obstacle detection according to claim 7 further comprising a limiting device and means for applying said impulses of longer duration to said limiting device in order to remove the peaks thereon before application of said impulses to said receiver.

9. System for obstacle detection according to claim 7 wherein means is provided for subjecting said two trains of impulses to relative time delays such that said impulses of longer duration have a duration not exceeding double the duration of said transmitted impulses.

HENRI G. BUSIGNIES.

REFERENCES CITED

The following references are of record in the file of this patent:

UNITED STATES PATENTS

| Number | Name | Date |
| --- | --- | --- |
| 2,055,883 | Terry | Sept. 29, 1936 |
| 2,227,598 | Lyman et al. | Jan. 7, 1941 |
| 2,063,093 | Gutmann | Dec. 8, 1936 |
| 2,166,688 | Kell | July 18, 1939 |
| 2,226,459 | Bingley | Dec. 24, 1940 |
| 2,145,332 | Bedford | Jan. 31, 1939 |
| 1,924,174 | Wolf | Aug. 29, 1933 |
| 1,982,271 | Turner | Nov. 27, 1934 |